US010998952B2

(12) United States Patent
Kishiyama et al.

(10) Patent No.: US 10,998,952 B2
(45) Date of Patent: May 4, 2021

(54) USER APPARATUS AND SIGNAL TRANSMISSION METHOD FOR MAPPING SOUNDING REFERENCE SIGNALS

(71) Applicant: NTT DOCOMO, INC., Tokyo (JP)

(72) Inventors: Yoshihisa Kishiyama, Tokyo (JP); Yuichi Kakishima, Tokyo (JP)

(73) Assignee: NTT DOCOMO, INC., Tokyo (JP)

( * ) Notice: Subject to any disclaimer, the term of this patent is extended or adjusted under 35 U.S.C. 154(b) by 0 days.

(21) Appl. No.: 16/252,883

(22) Filed: Jan. 21, 2019

(65) Prior Publication Data

US 2019/0158164 A1     May 23, 2019

Related U.S. Application Data

(63) Continuation of application No. 15/116,348, filed as application No. PCT/JP2015/052835 on Feb. 2, 2015, now abandoned.

(30) Foreign Application Priority Data

Feb. 7, 2014   (JP) ................................ 2014-022835
Apr. 30, 2014  (JP) ................................ 2014-094157

(51) Int. Cl.
  *H04B 7/06*   (2006.01)
  *H04L 5/00*   (2006.01)
  (Continued)

(52) U.S. Cl.
  CPC ......... *H04B 7/0617* (2013.01); *H04B 7/0413* (2013.01); *H04B 7/0695* (2013.01);
  (Continued)

(58) Field of Classification Search
  CPC ....... H04L 5/0048–0055; H04W 72/0413–042
  See application file for complete search history.

(56) References Cited

U.S. PATENT DOCUMENTS

2010/0265910 A1* 10/2010 Suo ...................... H04L 5/0048
                                                         370/330
2011/0116436 A1   5/2011 Bachu et al.
  (Continued)

FOREIGN PATENT DOCUMENTS

JP     2011015393 A      1/2011
JP     2012-526491 A    10/2012
  (Continued)

OTHER PUBLICATIONS

Office Action issued in counterpart Chinese Patent Application No. 201580006927.9. dated Jan. 28, 2019 (21 Pages).
  (Continued)

*Primary Examiner* — Marcus Smith
(74) *Attorney, Agent, or Firm* — Osha Bergman Watanabe & Burton LLP

(57) ABSTRACT

A user apparatus is disclosed herein that includes a receiver configured to receive a plurality of synchronization signals and a transmitter configured to transmit a sounding reference signal associated with a specific synchronization signal of the plurality of synchronization signals. The transmitter also maps the sounding reference signal to consecutive OFDM symbols in one slot.

3 Claims, 9 Drawing Sheets

(51) Int. Cl.
  *H04W 72/04* (2009.01)
  *H04W 16/32* (2009.01)
  *H04B 7/0413* (2017.01)
  *H04W 16/28* (2009.01)
  *H04L 27/26* (2006.01)
  *H04W 84/04* (2009.01)

(52) U.S. Cl.
  CPC .......... *H04L 5/0023* (2013.01); *H04L 5/0048* (2013.01); *H04L 5/0053* (2013.01); *H04L 5/0094* (2013.01); *H04W 16/32* (2013.01); *H04W 72/042* (2013.01); *H04W 72/0413* (2013.01); *H04L 27/2613* (2013.01); *H04W 16/28* (2013.01); *H04W 84/042* (2013.01)

(56) References Cited

U.S. PATENT DOCUMENTS

| | | | | |
|---|---|---|---|---|
| 2012/0014349 A1* | 1/2012 | Chung | | H04B 7/0684 370/329 |
| 2012/0087427 A1* | 4/2012 | Noh | | H04B 7/0613 375/260 |
| 2012/0327876 A1* | 12/2012 | Ouchi | | H04B 1/713 370/329 |
| 2013/0040684 A1 | 2/2013 | Yu et al. | | |
| 2013/0265962 A1 | 10/2013 | Ouchi et al. | | |
| 2013/0301452 A1* | 11/2013 | Yoon | | H04W 72/0413 370/252 |
| 2015/0009951 A1* | 1/2015 | Josiam | | H04L 5/0051 370/330 |
| 2015/0189648 A1* | 7/2015 | Suzuki | | H04L 5/14 370/329 |
| 2015/0208443 A1 | 7/2015 | Jung et al. | | |
| 2016/0006122 A1 | 1/2016 | Seol et al. | | |

FOREIGN PATENT DOCUMENTS

| | | |
|---|---|---|
| JP | 2013-219507 A | 10/2013 |
| WO | 2010107945 A2 | 9/2010 |
| WO | 2013/022292 A2 | 2/2013 |
| WO | 2014/021633 A1 | 2/2014 |

OTHER PUBLICATIONS

International Search Report issued in corresponding application No. PCT/JP2015/052835 dated Apr. 7, 2015 (2 pages).
Written Opinion of the International Searching Authority issued in corresponding application No. PCT/JP2015/052835 dated Apr. 7, 2015 (4 pages).
Office Action issued in corresponding Japanese Application No. 2014-094157, dated Jun. 26, 2018 (5 pages).
Office Action issued in counterpart Chinese Patent Application No. 201580006927.9, dated Jul. 29, 2019 (15 Pages).
Office Action issued in the counterpart Chinese Patent Application No. 201580006927.9, dated Feb. 3, 2020 (10 pages).
Office Action in counterpart Chinese Patent Application No. 201580006927.9, dated Jul. 1, 2020 (10 Pages).
Office Action issued in corresponding Japanese Application No. 2014-94157, dated Aug. 18, 2020 (5 pages).

* cited by examiner

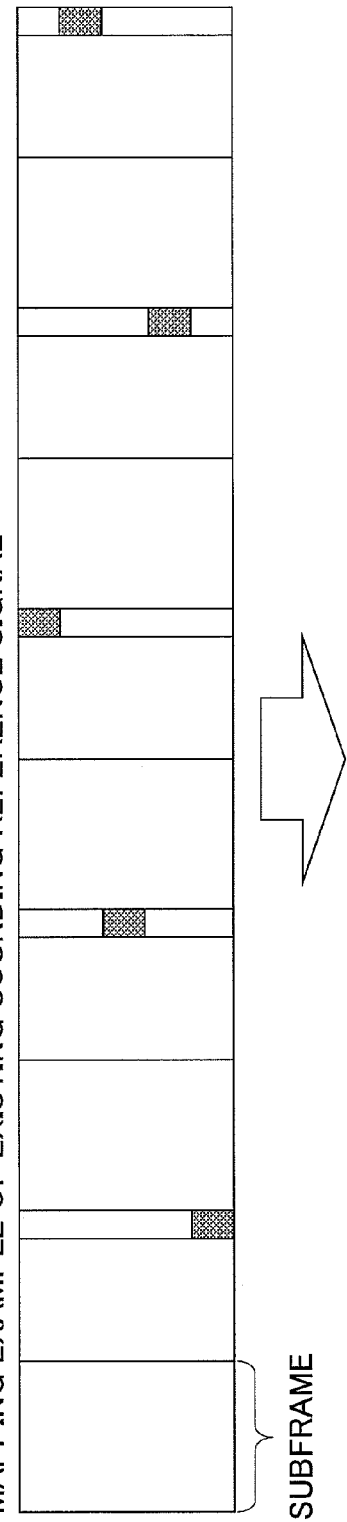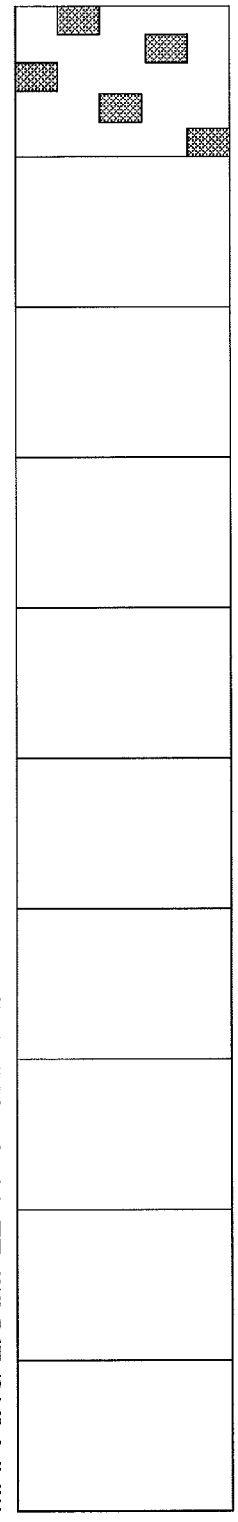
FIG. 3(a) MAPPING EXAMPLE OF EXISTING SOUNDING REFERENCE SIGNAL
FIG. 3(b) MAPPING EXAMPLE OF SOUNDING REFERENCE SIGNAL IN THE PRESENT EMBODIMENT

MULTIPLEX USERS BY CODE
MULTIPLEXING (CDM)

FREE RESOURCE FOR
OTHER USERS
(FREQUENCY MULTIPLEXING)

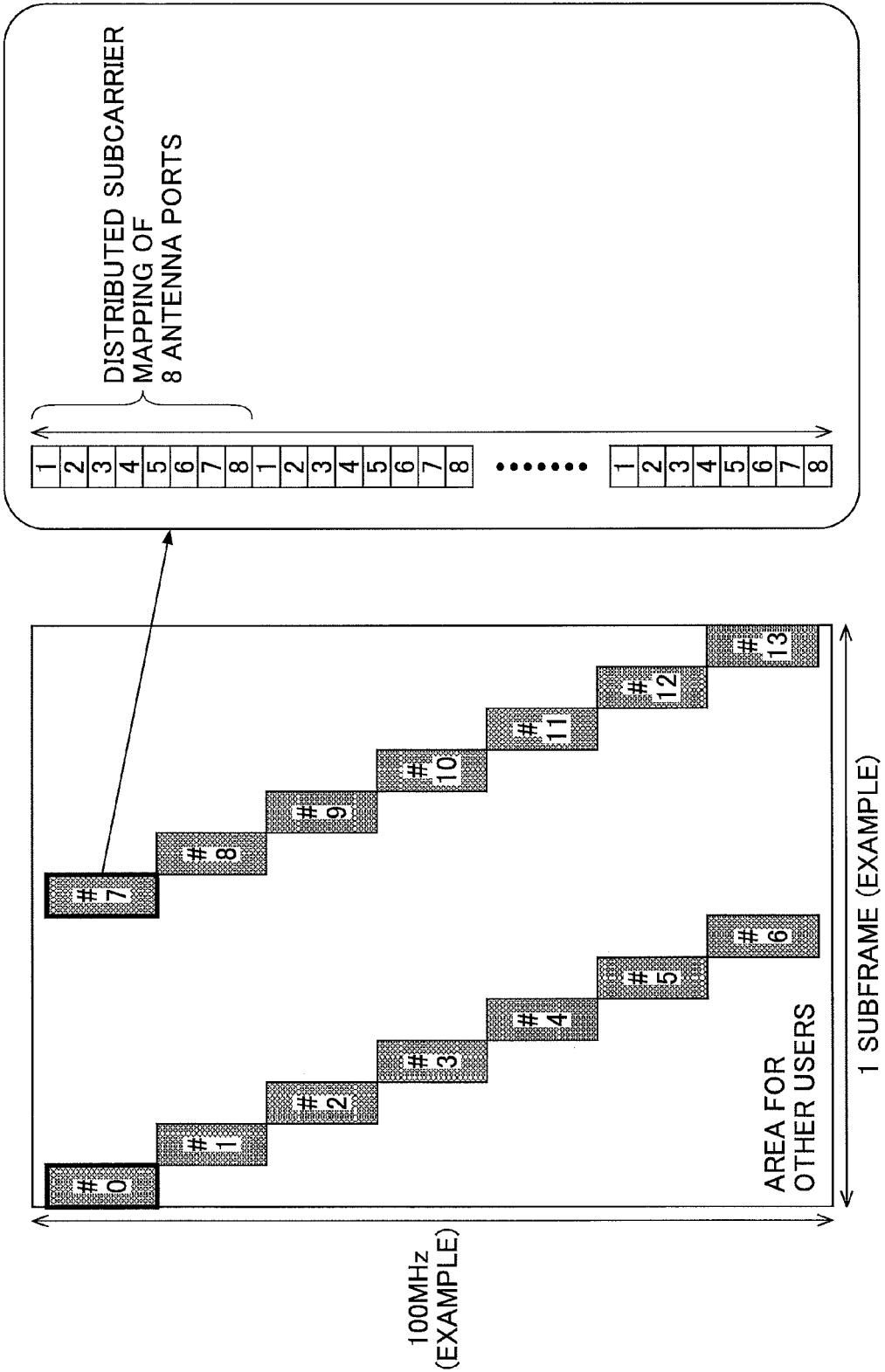

USER APPARATUS AND SIGNAL TRANSMISSION METHOD FOR MAPPING SOUNDING REFERENCE SIGNALS

CROSS-REFERENCE TO RELATED APPLICATIONS

This application is a continuation application of U.S. application Ser. No. 15/116,348, filed on Aug. 3, 2016, which is a national phase application of PCT/JP2015/052835, filed on Feb. 2, 2015, which claims priority to Japanese Patent Application No. JP2014-022835, filed on Feb. 7, 2014, and Japanese Patent Application No. JP2014-094157, filed on Apr. 30, 2014. The contents of these applications are hereby incorporated by reference in their entirety.

TECHNICAL FIELD

The present invention relates to a base station and a user apparatus in a radio communication system.

BACKGROUND ART

In LTE/LTE-Advanced, MIMO techniques are adopted for enhancing system capacity, cell-edge user throughput and the like. Also, a heterogeneous network technique is adopted for realizing high quality communication by reducing inter-cell interference while different types of base stations (macro cell, small cell and the like) coexist.

Especially, in a small cell of the heterogeneous network, it is assumed to use a high frequency band. Here, since propagation loss increases in the high frequency band, in order to compensate for it, it is considered to apply massive MIMO that performs narrow beamforming in which the beam width is narrow.

The massive MIMO is a large-scale MIMO having many antennas (example: 100 elements), by which inter-user interference can be made small since the strength of the electric field can be concentrated on a small area.

Also, in the heterogeneous network, in order to compensate for propagation loss in the high frequency band, it is considered to perform beamforming using a plurality of antennas not only for downlink but also for uplink.

RELATED ART DOCUMENT

Patent Document

[PATENT DOCUMENT 1] JP2013-219507

SUMMARY OF THE INVENTION

Problem to be Solved by the Invention

However, in the existing LTE/LTE-Advanced, any sounding reference signal (sounding reference signal: SRS) suitable for beamforming in the uplink is not defined. Therefore, in the existing technique, when performing beamforming in the uplink, for example, it is not possible to efficiently determine which beam results in good reception quality among a plurality of beams that the user apparatus forms.

The present invention is contrived in view of the above-mentioned points, and an object of the present invention is to provide a technique, in a radio communication system including a user apparatus and a base station that perform beamforming, to enable to efficiently select a good beam.

Means for Solving the Problem

According an embodiment of the present invention, there is provided a user apparatus configured to perform communication with a base station in a radio communication including the base station and the user apparatus, including:
transmission means configured to transmit a plurality of uplink signals by a plurality of antenna ports or beams; and
reception means configured to receive, from the base station that monitors the plurality of uplink signals, identification information of a specific uplink signal received by the base station;
wherein the transmission means transmits a data signal using an antenna port or a beam corresponding to an uplink signal that is identified by the identification information received by the reception means.

According an embodiment of the present invention, there is provided a base station configured to perform communication with a user apparatus in a radio communication system including the base station and the user apparatus, including:
transmission means configured to transmit a plurality of downlink reference signals by a plurality of antenna ports or beams; and
reception mans configured to receive, from the user apparatus that monitors the plurality of downlink reference signals, an uplink signal including identification information of a specific downlink reference signal received by the user apparatus;
wherein the transmission means is configured to transmit control information to the user apparatus by using an antenna port or a beam corresponding to a downlink reference signal that is identified by the identification information received by the reception means.

According an embodiment of the present invention, there is provided a communication method executed by a user apparatus configured to perform communication with a base station in a radio communication including the base station and the user apparatus, including:
a step of transmitting a plurality of uplink signals by a plurality of antenna ports or beams;
a step of receiving, from the base station that monitors the plurality of uplink signals, identification information of a specific uplink signal received by the base station; and
a step of transmitting a data signal using an antenna port or a beam corresponding to an uplink signal that is identified by the identification information.

According an embodiment of the present invention, there is provided a communication method executed by a base station configured to perform communication with a user apparatus in a radio communication system including the base station and the user apparatus, including:
a step of transmitting a plurality of downlink reference signals by a plurality of antenna ports or beams;
a step of receiving, from the user apparatus that monitors the plurality of downlink reference signals, an uplink signal including identification information of a specific downlink reference signal received by the user apparatus; and a step of transmitting control information to the user apparatus by using an antenna port or a beam corresponding to a downlink reference signal that is identified by the identification information.

Effect of the Present Invention

According to an embodiment of the present invention, it becomes possible, in a radio communication system including a user apparatus and a base station that perform beamforming, to efficiently select a good beam.

BRIEF DESCRIPTION OF THE DRAWINGS

FIG. 3(a) and FIG. 3(b) are diagrams for explaining a sounding reference signal in the present embodiment;

FIG. 6 is a diagram showing another example of mapping of a sounding reference signal in the present embodiment;

EMBODIMENTS FOR CARRYING OUT THE INVENTION

In the following, embodiments of the present invention are described with reference to figures. The embodiments described below are merely examples, and the embodiments to which the present invention is applied are not limited to the embodiments below. For example, although it is assumed that a radio communication system of the present embodiment is a system of a scheme complying with LTE and that OFDMA is used in the downlink and SC-FDMA is used in the uplink, the present invention is not limited to this. For example, OFDMA may be used for both of uplink and downlink. Also, the present invention can be applied to schemes other than LTE. In the specification and the claims, the term "LTE" is used as a wide meaning including not only a communication scheme corresponding to 3GPP release 8 or 9, but also a communication scheme corresponding to 3GPP release 10, 11, 12 or later release.

(System Configuration)

Figure 1:
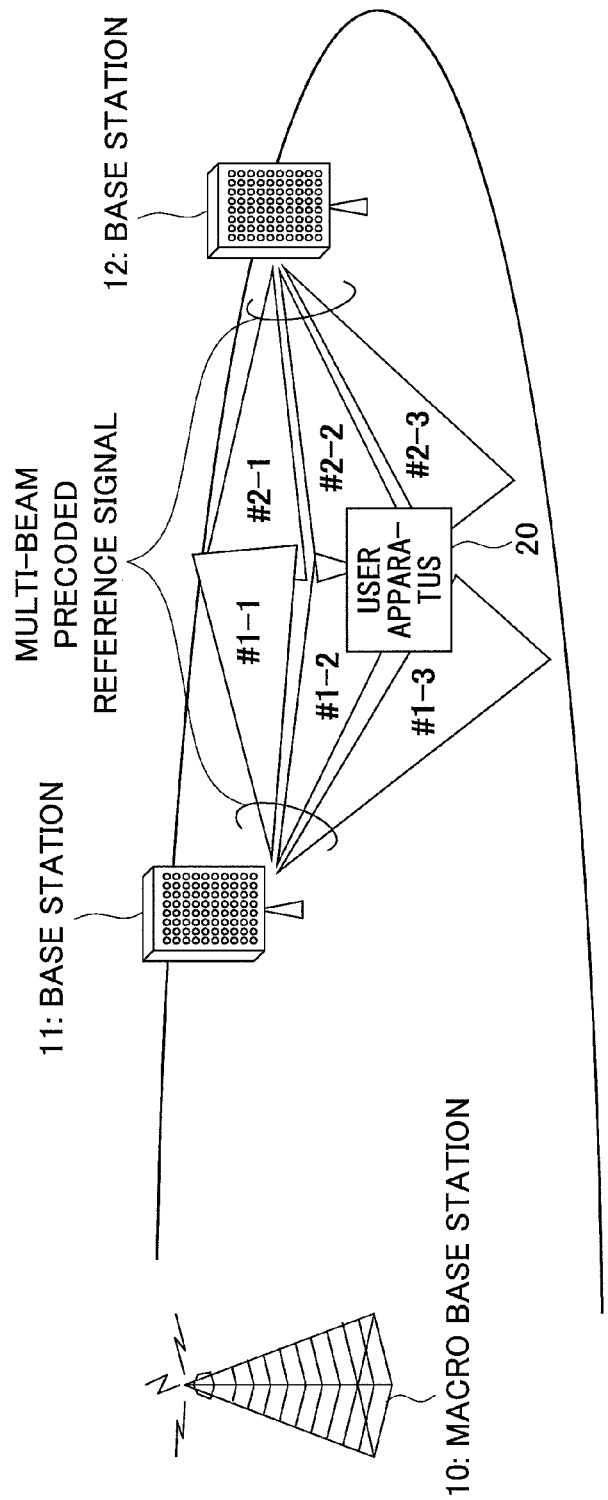
FIG. 1 is a whole block diagram of a radio communication system in an embodiment of the present invention.

FIG. 1 shows a whole block diagram of a radio communication system in an embodiment of the present invention. The radio communication system of the present embodiment includes a macro base station 10 that forms a macro cell, and base stations 11, 12 provided in a coverage area of the macro cell. Also, FIG. 1 shows a user apparatus 20 that communicates with the macro base station 10, base stations 11, 12 and the like.

The radio communication system is configured such that a macro coverage is ensured by the macro base station 10 using a low frequency band, and traffic of small areas (example: hot spots) is absorbed by the base stations 11, 12 using a high frequency band. However, such frequency assignment is merely an example, and the assignment is not limited to this.

The base station 11, 12 of the present embodiment is provided with a function of massive MIMO so as to be able to form various beams from a wide beam to a narrow beam. In the present embodiment, as shown in FIG. 1, a plurality of precoded reference signals (each being referred to as discovery signal) are transmitted from the base station 11, 12, wherein each precoded reference signal is transmitted by a beam (one antenna port or a plurality of antenna ports). "Reference signal is precoded" means that, in an example of transmission, a transmission signal is multiplied by a weight for each antenna port such that the reference signal is transmitted by a beam of a width. For example, in the example shown in FIG. 1, a discovery signal is transmitted from the base station 12 in each of a beam 2-1, a beam 2-2 and a beam 2-3. Although FIG. 1 shows a configuration in which the macro base station 10 exists, it is possible to adopt a configuration in which the macro base station 10 does not exist.

The user apparatus 20 performs operation to monitor (search) discovery signals transmitted from the base stations 11, 12 and to transmit a sounding reference signal (sounding reference signal: SRS) including identification information (index and the like) of a detected discovery signal to a base station of a transmission source of the detected discovery signal. Operation details including this operation are described later. Monitoring a discovery signal includes measuring received power of each discovery signal.

(On User Apparatus 20)

The user apparatus 20 of the present embodiment can simultaneously communicate with the macro base station 10 that forms the macro cell (PCell and the like) and base stations 11, 12 and the like that form small cells (SCell and the like) by applying carrier aggregation, and also, the user apparatus 20 can communicate with only one base station.

The user apparatus 20 of the present embodiment is provided with a plurality of antennas and is provided with a function configured to perform uplink MIMO transmission. That is, the user apparatus 20 can perform uplink beamforming and uplink transmission of a plurality of ranks.

By the way, in general, as to the user apparatus (UE), it can be considered that also many user apparatuses having one antenna are used into the future depending on the usage. For example, they are low-cost MTC terminals and the like. Along with that, it can be considered that user apparatuses including MIMO transmission functions of about 4 antennas become mainstream.

Figure 2:
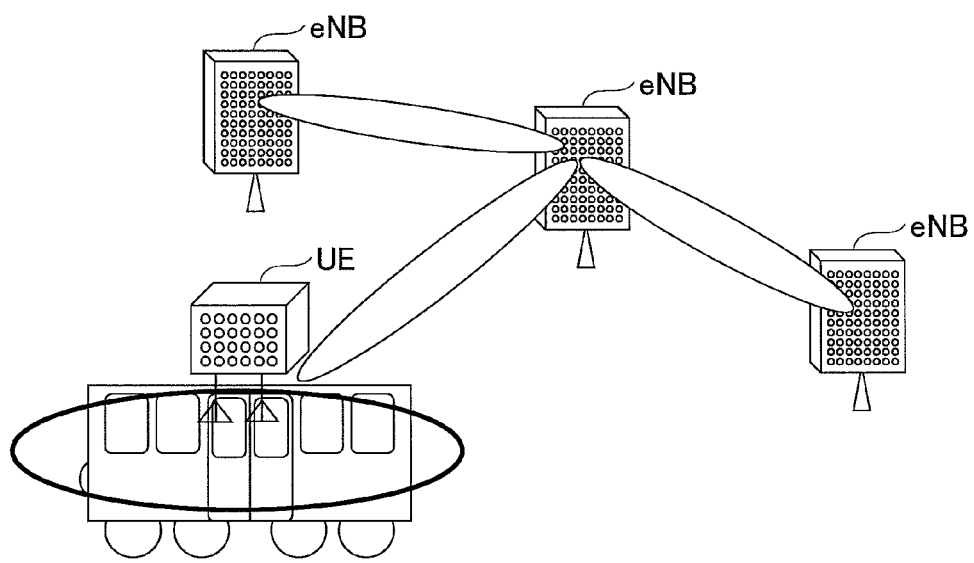
FIG. 2 is a diagram showing an application example of a user apparatus that performs beamforming.

Further, depending on the usage, it is considered that, also a user apparatus provided with a function of Massive MIMO by 16 or more antennas is used. As such a user apparatus, for example, as shown in FIG. 2, a user apparatus can be considered having a role of a communication apparatus mounted in a public vehicle such as a train, a relay apparatus in a backhaul of inter-base station communication, and the like.

(On Sounding Reference Signal)

The sounding reference signal (sounding reference signal: SRS) that the user apparatus 20 of the present embodiment transmits in the uplink is described. The sounding reference signal of the present embodiment may be referred to as an enhanced sounding reference signal (enhanced sounding reference signal: ESRS). The sounding reference signal is a reference signal transmitted from the user apparatus for the base station to measure uplink reception quality (including received power) and the like.

For comparison with the sounding reference signal of the present embodiment, FIG. 3(a) shows a sounding reference signal (conventional SRS) defined in the current LTE. As shown in FIG. 3(a), the conventional sounding reference signal is configured to be transmitted, for example, by the last symbol (OFDM symbol) of a subframe every two subframes, and to cover the whole band by frequency hopping. However, as to the conventional sounding reference signal, since mapping in which 1 symbol is inserted at the last of the subframe is performed, signal switching is performed suddenly, which is not desirable from the viewpoint of power control. Also, since the conventional sounding reference signal covers the whole band by distributing bands by frequency hopping, there is a possibility in that, especially for supporting a wide band, signal transmission is distributed so that sufficient coverage cannot be obtained. Further, it can be considered that the frequency of once per 2 subframes is unnecessary for the purpose of uplink reception quality measurement in the base station side, and it can be considered that transmission at such a high frequency is inefficient in terms of use of radio resources.

Thus, in the present embodiment, as shown in FIG. 3(b), transmission is performed with lower frequency (sparsely) than that for the conventional sounding reference signal. The "low frequency" is, for example, once in 10-20 ms. Also, at the timing of sounding reference signal transmission, the sounding reference signal is mapped in high density. That is, for example, in the mapping, the whole bandwidth that the user apparatus 20 uses is covered by one time (or, a small number of times greater than 1) transmission. In the example shown in FIG. 3(b), an example is shown in which the sounding reference signal is mapped over the whole last subframe of the frame.

According to such an assignment of the sounding reference signal, it becomes unnecessary to use a format (shortened PUCCH format) in which the last one symbol is skipped in PUCCH like the conventional sounding reference signal, and also, radio resources can be utilized efficiently since the transmission is performed at low frequency. Also, since high density transmission is performed, it is preferable in terms of coverage.

Figure 4A:
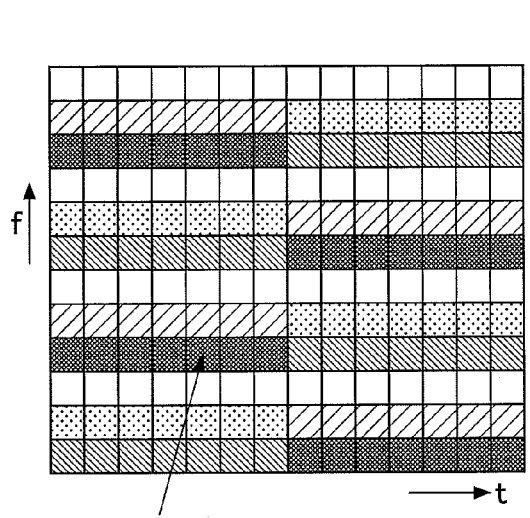
FIG. 4(a) and FIG. 4(b) are diagrams showing a mapping example of a sounding reference signal in the present embodiment.
Figure 4B:
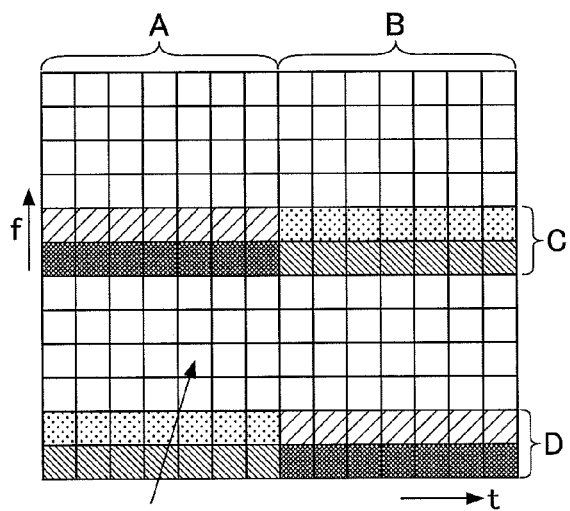

FIG. 4(a) and FIG. 4(b) show concrete mapping examples of the sounding reference signal in the present embodiment. Although each block of FIG. 4(a) and FIG. 4(b) show one scheduling unit (vertical 12 subcarriers, horizontal 1 subframe) defined in LTE, it is not limited to this. As to FIG. 4(a), FIG. 4(b), the size of height×width is arbitrary. Such a block is mapped over the whole system band, for example, and transmission of the sounding reference signal is performed periodically.

In the example here, the sounding reference signal supports 4 antenna ports per one user apparatus. That is, uplink MIMO transmission and beamforming up to 4 layers are supported. In each of FIG. 4(a) and FIG. 4(b), difference of hatching indicates difference of antenna ports. Also, difference of hatching may be difference of beams. That is, different hatching may indicate different beam. Also, each of FIG. 4(a) and FIG. 4(b) indicates mapping of one user apparatus.

In the example of FIG. 4(a), compared with the example of FIG. 4(b), mapping is performed with high density, so that multiplexing of a plurality of users is performed by code multiplexing. In the example of FIG. 4(b), multiplexing of a plurality of users is performed by frequency multiplexing. A plurality of users may be multiplexed by using both of code multiplexing and frequency multiplexing. Also, in each of FIG. 4(a) and FIG. 4(b), the sounding reference signal is mapped continuously in the time direction.

Assignment of radio resources (transmission timing, frequency position and the like) for transmitting the sounding reference signal to each user apparatus may be performed semi-statically by system information or dynamically by a control channel (PDCCH, EPDCCH).

In the present embodiment, the user apparatus 20 can transmit the sounding reference signal by performing uplink beamforming. In this case, for example, a plurality of beams may be formed by dividing resources in the frequency direction (by frequency multiplexing), or by dividing resources in the time direction (by time multiplexing). For example, in the example of FIG. 4(b), each slot of A and B may form 4 beams, or each frequency area of C and D may form 4 beams. By the way, in the sounding reference signal of the present embodiment, it is not essential to form a beam, and the beam may not be formed.

Figure 5A:
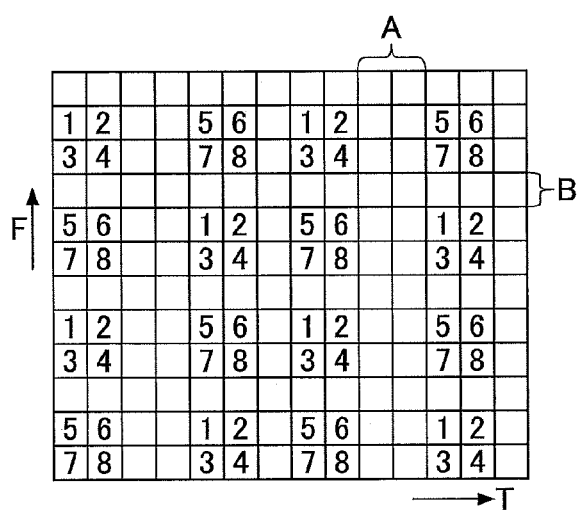
FIG. 5(a) and FIG. 5(b) are diagrams showing another example of mapping of a sounding reference signal in the present embodiment.
Figure 5B:
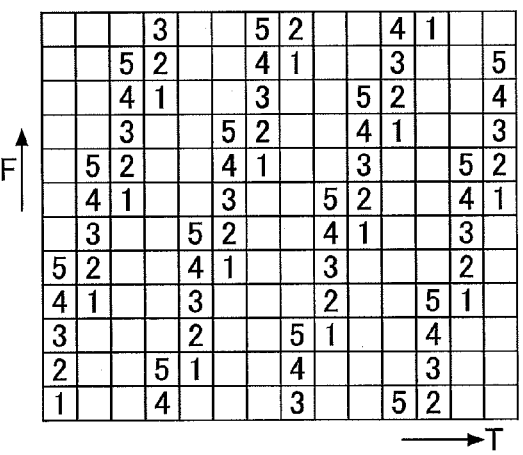

FIG. 5(a) and FIG. 5(b) are diagrams showing another example of mapping of a sounding reference signal. In the figured, a sounding reference signal is mapped to a resource element in which a number is described. Also, the number indicates distinction of a beam or an antenna port. Also, FIG. 5(a) is an example of a mapping method for forming a gap in the time direction and in the frequency direction. For example, mapping is not performed at symbols indicated by A, and mapping is not performed at the frequency region indicated by B.

FIG. 5(b) is an example in a case where mapping is performed to all resources in the time direction and in the frequency direction. In the case of FIG. 5(b), there is no time/frequency resource that is not used at all as shown in FIG. 5(a).

The mapping shown in FIG. 5 (a) and FIG. 5(b) may be used for mapping of a discovery signal transmitted from the base station 11, 12 shown in FIG. 1 to the user apparatus 20. Also, the mapping shown in FIG. 4(a) and FIG. 4(b) may be used for mapping of a discovery signal transmitted from the base station 11, 12 shown in FIG. 1 to the user apparatus 20.

FIG. 6 is a diagram showing another example of mapping of the sounding reference signal in the present embodiment.

The example shown in FIG. 6 is an example in which the sounding reference signal is transmitted by frequency hopping so as to cover the whole system band (example: 100 MHz) in one subframe. The example of FIG. 6 shows mapping of one user, in which, frequency hopping is performed in the first slot so as to cover the whole band as indicated by #0~#6, and in the next slot, frequency hopping is performed as indicated by #7~#13 with the same pattern as #0~#6. Other users can transmit the sounding reference signal by similar frequency hopping in an area other than the area shown in #0~#13.

A configuration example of each block that forms #0~#13 is shown in the right side of FIG. 6. As shown in the figure, in this example, 8 antenna ports are supported, and the length in the frequency direction is a length of 14 resource blocks (=168 subcarriers). The number in the figure indicates an antenna port, for example. However, the example of FIG. 6 is merely an example, and the length of each block may be made longer or shorter than the length shown in FIG. 6.

Also, as shown in #0~#6 and #7~#13, by repeating similar hopping in each slot, for example, a speed of the user apparatus can be estimated by measuring phase rotation. For example, phase rotation in the interval from #0 to #7 is measured so as to estimate a speed. Also, the number of antenna ports can be extended by using #0~#6 for antenna ports 1-8, and by using #7~#13 for antenna ports 9-16.

(Operation Example of Radio Communication System)

Figure 7:
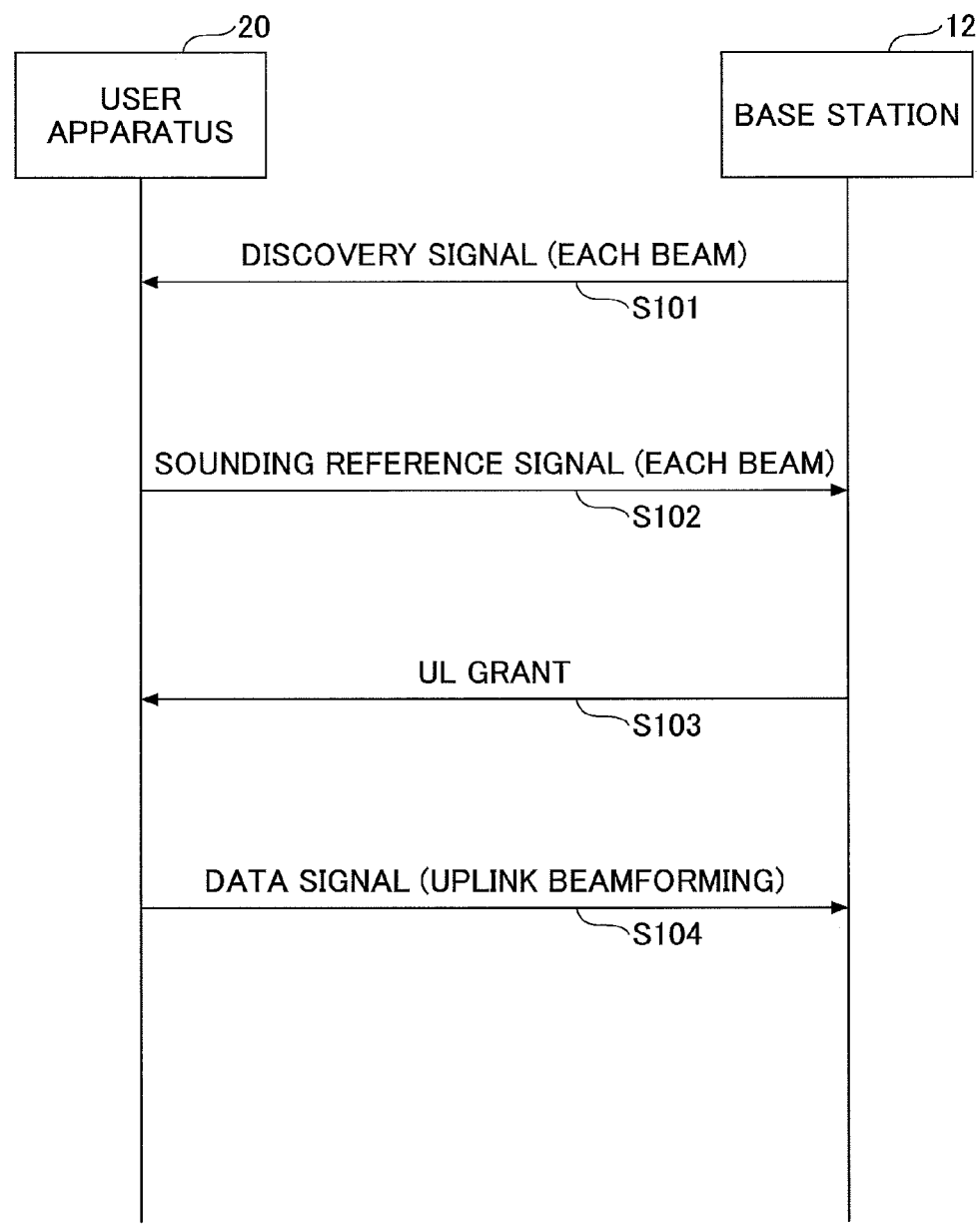
FIG. 7 is a sequence diagram showing an operation example of a radio communication system in the present embodiment.

Next, by mainly referring to FIG. 7, an operation example of a radio communication system (the radio communication system shown in FIG. 1) in an embodiment of the present invention is described. In the example shown in FIG. 7, since the user apparatus 20 detects a discovery signal transmitted from the base station 12, the base station 12 is shown in FIG. 7 in the base station 11 and the base station 12.

As described before, the base station 12 is transmitting a plurality of precoded discovery signals each forming a beam (step 101). The user apparatus 20 monitors, for example, discovery signals that can be received so as to detect (receive) a specific discovery signal (one or a plurality of discovery signals). By the way, since a beam may be formed by a plurality of antenna ports, each beam can be associated with a plurality of antenna ports. More specifically, in the monitoring, the user apparatus 20 measures received power of each discovery signal so as to specify a discovery signal of large receive power. By the way, the amount for measurement is not limited to received power, and it may be other amounts (reception quality). Also, the amount for measurement including received power may be collectively called reception quality.

Instead of monitoring all discovery signals that can be received, measurement of discovery signals transmitted from the base station 12 may be performed by narrowing candidates by receiving assistance information (to be referred to as macro-assisted information) from the macro base station 10. The macro-assisted information includes transmission timing and sequence information and the like of discovery signals in the coverage of the macro cell.

In this case, since the user apparatus 20 ascertains transmission timing and the sequence of each discovery signal based on the macro-assisted information received from the macro base station 10, the user apparatus 20 detects (receives) each discovery signal transmitted from the base station 12 by monitoring the narrowed candidates by using them.

The discovery signal in the present embodiment has a function similar to that of a synchronization signal (PSS/SSS and the like) in LTE. Thus, the user apparatus 20 establishes frequency synchronization, and timing synchronization (symbol synchronization, frame synchronization and the like) with the base station 12 by receiving a discovery signal. Also, by the discovery signal, the user apparatus 20 may receive necessary information (minimum system information and the like) for communication in the coverage of the base station 12. A synchronization signal may be transmitted separately from the discovery signal, and, in that case, the user apparatus 20 receives a discover signal after establishing frequency synchronization and timing synchronization and the like by using the synchronization signal.

Next, the user apparatus 20 transmits a sounding reference signal to the base station 12 (step 102). In the present embodiment, in the small cell coverage area that the base station 12 using a high frequency band covers, in order to compensate for propagation loss, the user apparatus 20 performs transmission of a sounding reference signal by performing beamforming also in the uplink. That is, the user apparatus 20 transmits a precoded sounding reverence signal.

Figure 8:
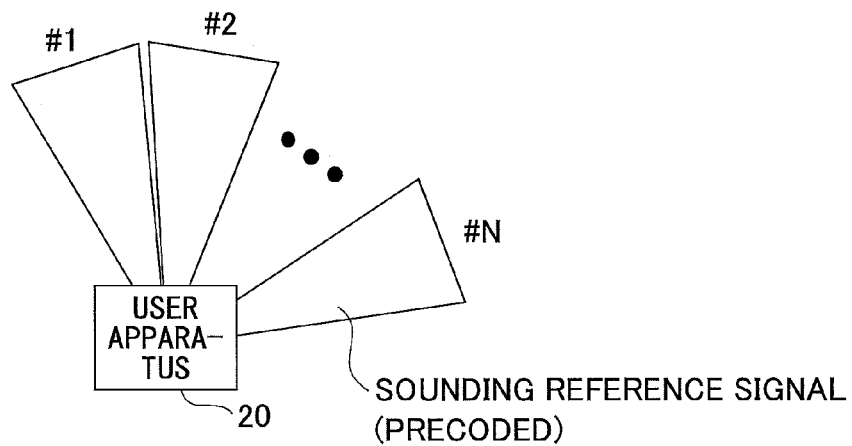
FIG. 8 is a diagram showing a sounding reference signal transmitted by a user apparatus 20.

FIG. 8 shows an image of a sounding reference signal that the user apparatus 20 transmits by each beam in step 102. In the example of FIG. 8, the user apparatus 20 transmits a sounding reference signal by each of beams 1-N. As described with reference to FIG. 4, each beam may be transmitted by time division multiplexing, or may be transmitted by frequency division multiplexing.

Each sounding reference signal that the user apparatus 20 transmits includes identification information (beam ID, index and the like) of a discovery signal that the user apparatus 20 detected. The identification information of a discovery signal included in each sounding reference signal is, for example, identification information of a discovery signal whose quality is the best (example: largest received power) based on the result of reception quality measurement. Also, the identification information of a discovery signal included in each sounding reference signal may be identification information of a predetermined number of discovery signals in descending order from the one of the best quality. For example, when it is assumed that the discovery signal 2-2 shown in FIG. 1 is the best reception quality, the user apparatus 20 transmits a sounding reference signal including identification information of the discovery signal 2-2.

The identification information of the discovery signal may be included in the sequence of each sounding reference signal, or a radio resource (frequency position, or time position, or frequency position and time position, and the like) for transmitting a sounding reference signal may be associated with identification information of the discovery signal.

The base station 12 monitors the sounding reference signal of each beam transmitted in step 102 of FIG. 7, performs measurement of reception quality (received power) of the received sounding reference signal, assigns a radio resource for the user apparatus 20 to transmit an uplink data signal (PUSCH and the like), and transmits an UL grant (control information including radio resource assignment information) to the user apparatus 20 by a downlink control channel (PDCCH, EPDCCH and the like) (step 103).

In step 103, the base station 12 transmits, together with an UL grant, identification information (index and the like) of a sounding reference signal whose reception quality is good (example: received power is large) from among sounding reference signals transmitted by each beam. The identification information may be information included in the sounding reference signal, or may be information associated with a sequence included in the sounding reference signal.

The sounding reference signal of which reception quality is good is, for example, a sounding reference signal whose reception quality is equal to or greater than a predetermined threshold. Also, the sounding reference signal of which reception quality is good may be a sounding reference signal of which reception quality is the best. An uplink beam corresponding to a sounding reference signal of good reception quality in the base station 12 can be considered to be a proper beam in a case where the user apparatus 20 transmits a data signal in the uplink.

Also, in step 103, for example, the base station 12 transmits an UL grant by using a beam for transmitting a discovery signal that is identified by identification information (beam ID and the like) in the sounding reference signal received in step 102. That is, the base station transmits an UL grant using an antenna port for transmitting the discovery signal. The discovery signal identified by the identification information (beam ID and the like) in the sounding reference signal is a discovery signal received well by the user apparatus 20, so that it can be considered that the downlink beam that transmits the discovery signal is a proper beam for transmitting a downlink signal for the user apparatus 20.

Figure 9:
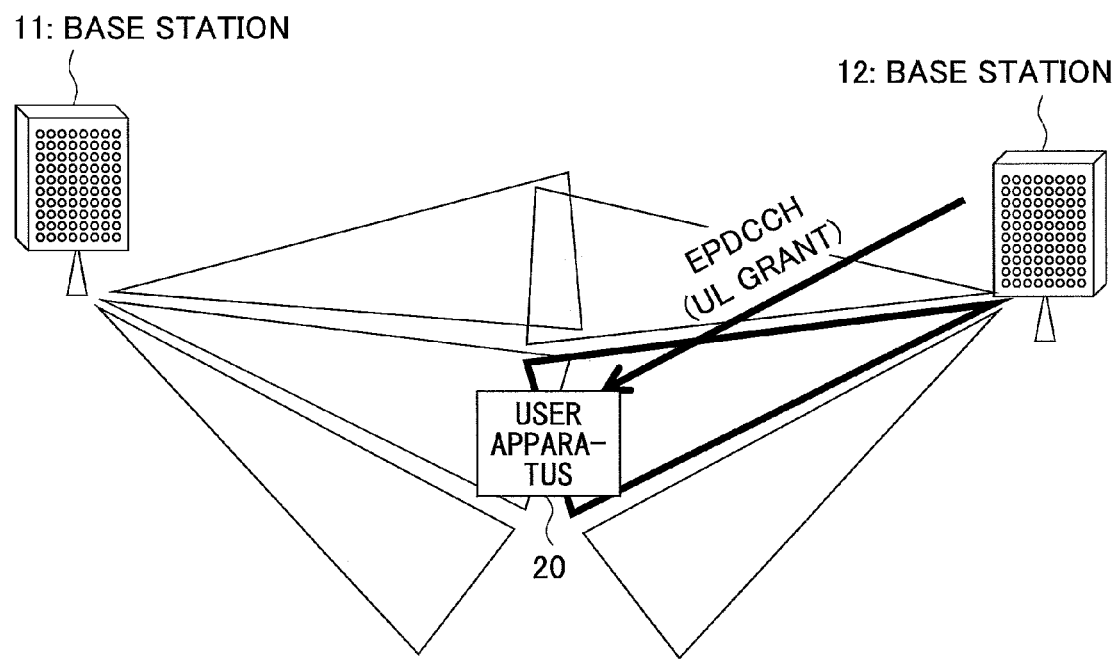
FIG. 9 is a diagram showing that a base station 12 transmits an UL grant to the user apparatus 20.

FIG. 9 shows transmission of the UL grant in step 103 of FIG. 7 more intelligibly. In the example of FIG. 9, since a discovery signal by a downlink beam enclosed by a thick line was received well in the user apparatus 20, the base station 12 transmits an UL grant by the beam. Also, in the example of FIG. 9, EPDCCH is used.

Next, the user apparatus 20 that receives the uplink grant (and identification information of a sounding reference signal received well) in step 103 of FIG. 7 transmits a data signal, a control signal and the like (PUSCH, PUCCH and the like) to the base station 12 by using an assigned resource (step 104). For the signal transmission here, a beam corresponding to the sounding reference signal identified by the identification information received with the UL grant in step 103 is used. That is, the signal is transmitted by using an antenna port for transmitting the sounding reference signal. Also, in step 104 and after the step, the user apparatus 20 performs measurement of a received discovery signal to transmit reception quality (CQI, rank and the like) to the base station 12 for each downlink beam (that is, for each discovery signal). Also for the transmission of the feedback information, a beam corresponding to the sounding reference signal notified from the base station 12 can be used. Accordingly, feedback information can be delivered to the base station 12 surely.

In the description so far, the user apparatus 20 transmits a sounding reference signal after transmitting a discovery signal. However, instead of transmitting a sounding reference signal, a PRACH (random access signal) may be transmitted. Processes performed by the PRACH are the same as those of the sounding reference signal described so far. However, when using a PRACH, a preamble sequence of the PRACH is associated with identification information (beam ID and the like) of the discovery signal. Also, a resource for transmitting a PRACH is associated with a user apparatus beforehand, so that the user apparatus 20 can use a resource associated with the user apparatus 20 as a resource for transmitting a PRACH. In this case, the base station 12 can ascertain user apparatus identification information (UE-ID (C-RNTI and the like), UE-specific VCID and the like) of the user apparatus 20 from a resource by which the PRACH is received, so as to be able to transmit an UL grant specifying the user apparatus identification information, for example.

(Signal Mapping to CC in Carrier Aggregation)

The user apparatus 20 can perform communication by carrier aggregation (CA) by using a plurality of component carriers (CCs) between the user apparatus 20 and the base station 12 (same applied to the base station 11).

In the present embodiment, for example, in the downlink, PDSCH, EPDCCH, CSI-RS and the like are transmitted in each CC (every CC) from the base station, and as for the uplink, PUSCH, EPUCCH and SRS (sounding reference signal) are transmitted in each CC (every CC).

As to a synchronization signal (PSS/SSS and the like), a downlink reference signal (discovery signal in the present embodiment), and PRACH, they may be transmitted by every CC or may be transmitted by one CC.

Figure 10:
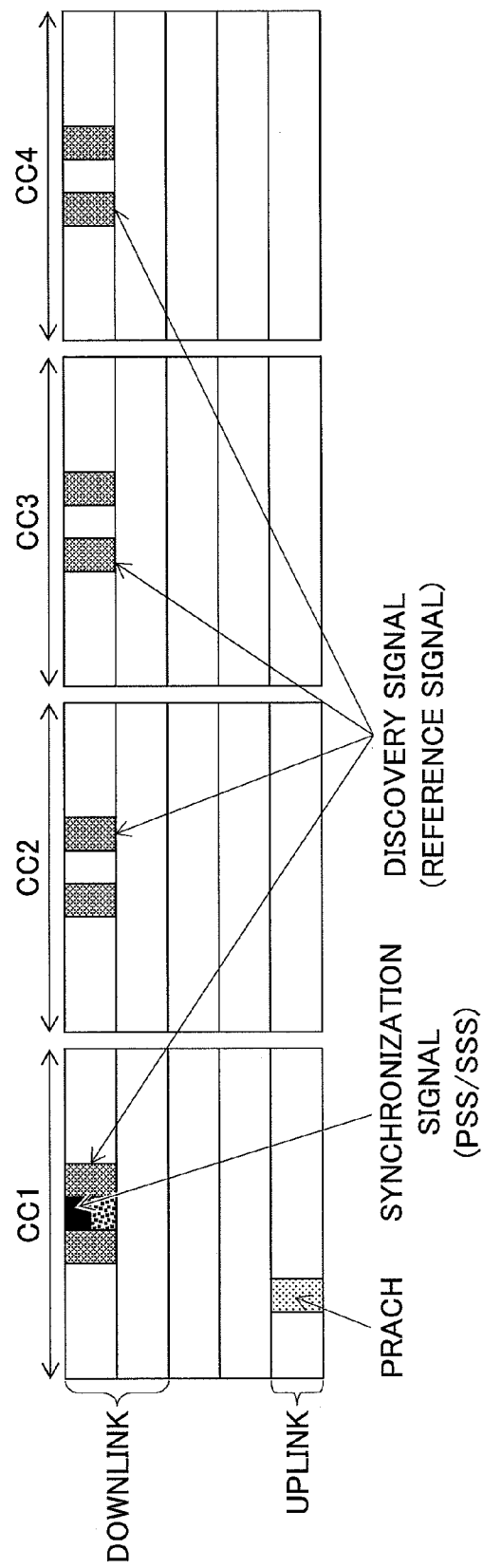
FIG. 10 is a diagram showing a mapping example of a signal in carrier aggregation.

FIG. 10 shows an example of mapping of signals to CCs in carrier aggregation. By the way, although FIG. 10 shows an example of TDD in which uplink and downlink are time-divided, similar mapping is possible for FDD. In the case of FDD, in FIG. 10, frequencies of CCs are regarded to be different between uplink and downlink.

In the example of FIG. 10, a PRACH is transmitted by CC1 which is one CC, and a PRACH is not transmitted by CCs 2, 3 and 4 that are other CCs for forming carrier aggregation. Also, the synchronization signal (PSS/SSS and the like) is transmitted by CC1 which is one CC, and the synchronization signal (PSS/SSS) is not transmitted by CCs 2, 3 and 4 that are other CCs for forming carrier aggregation. The downlink reference signal (discovery signal in the present embodiment) is transmitted by every CC.

As mentioned above, by transmitting only a signal (synchronization signal, PRACH and the like) that is initially used for performing communication of the base station 12 by using only one CC, it becomes possible to perform processing after that quickly.

(Apparatus configuration)

Next, configuration examples of the user apparatus 20 and the base station 12 described so far are described. Since the base stations 11 and 12 have the same configuration, a configuration of the base station 12 is described as a representative. The configuration of each apparatus described below shows a configuration especially related to the present embodiment, and each apparatus includes a function of user apparatus/base station that can execute operation complying with LTE, for example.

Figure 11:
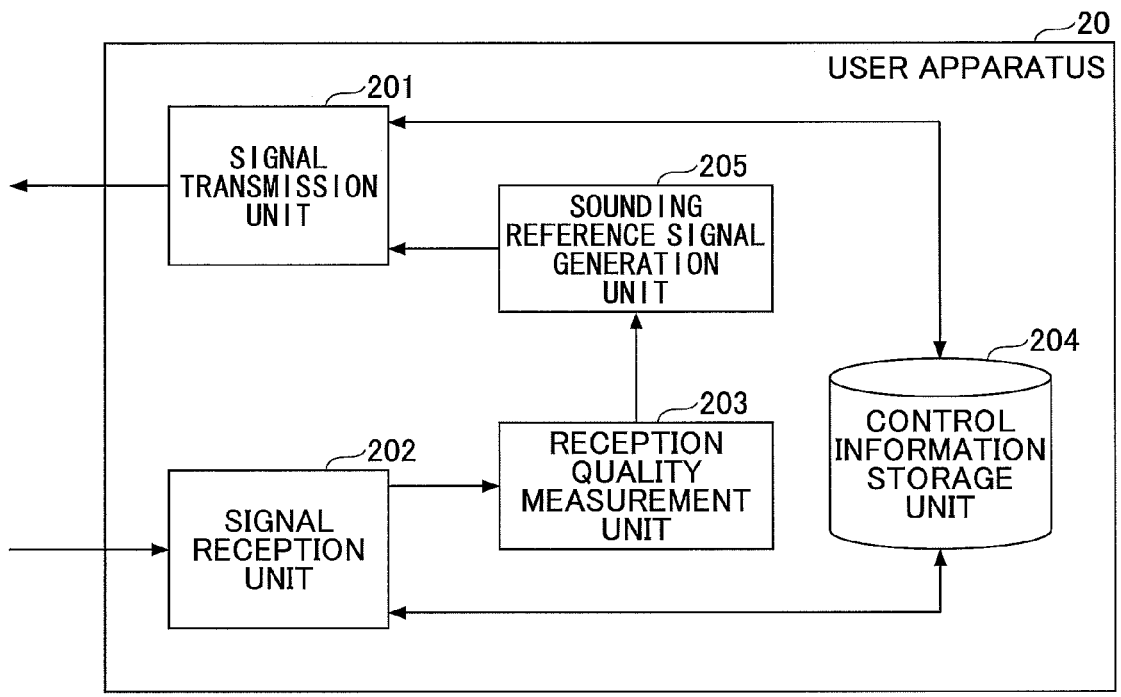
FIG. 11 is a functional block diagram of the user apparatus 20.

FIG. 11 shows a functional block diagram of the user apparatus 20. The user apparatus 20 includes a signal transmission unit 201, a signal reception unit 202, a reception quality measurement unit 203, a control information storage unit 204, and a sounding reference signal generation unit 205.

The signal transmission unit 201 generates a signal of a lower layer from information of an upper layer, and transmits the signal by radio. The signal reception unit 202 obtains information of the upper layer from a signal of the lower layer received by radio.

The signal reception unit 202 receives a discovery signal transmitted from the base station 12. Also, the signal reception unit 202 receives control information (UL grant, identification information of a sounding reference signal, and the like) from the base station 12, stores it in the control information storage unit 204, and performs reception operation based on the control information. The control information storage unit 204 stores various control information received from the base station 12.

The reception quality measurement unit 203 measures reception quality ((received power, CQI, rank and the like) of a discovery signal received by the signal reception unit 202, and passes the measurement result to the sounding reference signal generation unit 205.

The sounding reference signal generation unit 205 specifies identification information of a discovery signal that was received well based on measurement results obtained from discovery signals of each beam, generates a sounding reference signal including the identification information, and passes the sounding reference signal to the signal transmission unit 201. The signal transmission unit 201 transmits a sounding reference signal by each beam, and transmits a data signal and the like by a proper beam based on control information (UL grant, identification information of a sounding reference signal, and the like) that is received from the base station 12 and that is stored in the control information storage unit 204. Also, the signal transmission unit 201 transmits, to the base station 12, feedback information (CQI, rank and the like) based on a measurement result of reception quality of a signal received from the base station 12. As described before, PRACH can be used other than the sounding reference signal. Also, in such a case, the configuration shown in FIG. 11 can be used. That is, in that case, the sounding reference signal generation unit 205 performs signal generation of PRACH. Also, in that case, the sounding reference signal generation unit 205 may be referred to as "PRACH signal generation unit 205".

Figure 12:
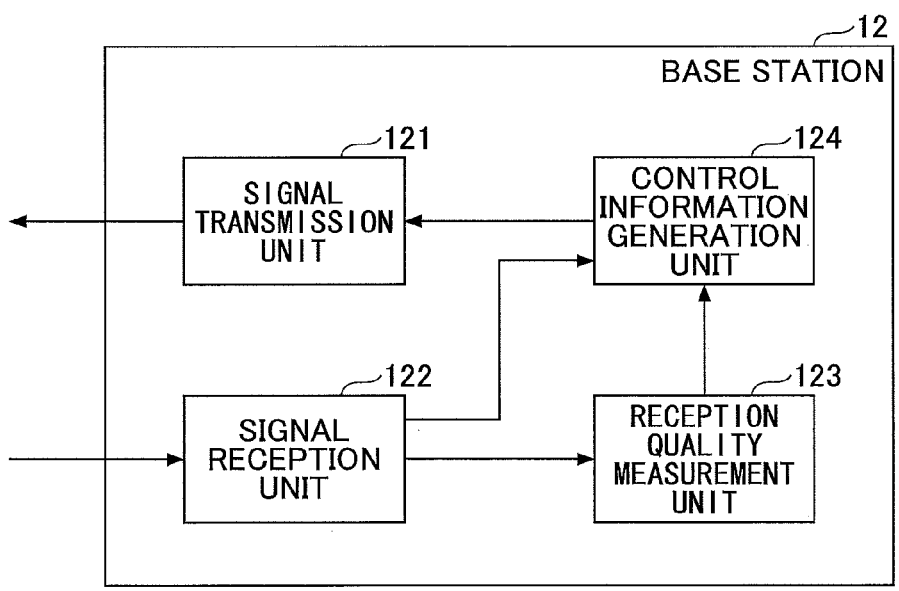
FIG. 12 is a functional block diagram of the base station 12.

FIG. 12 shows a functional block diagram of the base station 12. As shown in FIG. 12, the base station 12 includes a signal transmission unit 121, a signal reception unit 122, a reception quality measurement unit 123 and a control information generation unit 124.

The signal transmission unit 121 generates a signal of a lower layer from information of an upper layer, and transmits the signal by radio. The signal reception unit 122 obtains information of the upper layer from a signal of the lower layer received by radio.

The signal reception unit 122 receives a sounding reference signal of each beam transmitted from the user apparatus 20, the reception quality measurement unit 123 measures reception quality (received power and the like) of the sounding reference signal, and passes the measurement result to the control information generation unit 124. The control information generation unit 124 generates control information such as an UL grant by performing radio resource assignment, specifies a sounding reference signal received well based on the measurement result received from the reception quality measurement unit 123, and passes the identification information of the sounding reference signal to the signal transmission unit 121 together with the control information.

The signal transmission unit 121 transmits, to the user apparatus 20, control information generated by the control information generation unit 124 and identification information of the sounding reference signal by using a downlink control channel. Also, the signal transmission unit 121 transmits a discovery signal to the user apparatus 20 by each beam. The signal reception unit 122 obtains identification information of a discovery signal included in the sounding reference signal received from the user apparatus 20, the control information generation unit 124 specifies a beam to be used for downlink transmission based on the identification information, and the signal transmission unit 121 performs transmission of control information and the like using the beam. As described before, PRACH can be used other than the sounding reference signal. Also, in such a case, the configuration shown in FIG. 12 can be used.

Other than the scheme described so far, for example, assuming that the radio communication system of the present embodiment is TDD, the user apparatus 20 may form one or a plurality of beams corresponding to arrival direction(s) of well-received discovery signal(s) based on the measurement result of the discovery signal to transmit a sounding reference signal. This is a technique utilizing uplink-downlink symmetry of a channel in TDD. Also, the user apparatus 20 may transmit a sounding reference signal by forming one or a plurality of beams randomly.

SUMMARY OF EMBODIMENT, EFFECT, AND THE LIKE

As described above, in the present embodiment, there is provided a user apparatus configured to perform communication with a base station in a radio communication including the base station and the user apparatus, including:

transmission means configured to transmit a plurality of uplink signals (example: sounding reference signals, PRACHs) by a plurality of antenna ports or beams; and reception means configured to receive, from the base station that monitors the plurality of uplink signals, identification information of a specific uplink signal received by the base station;

wherein the transmission means transmits a data signal using an antenna port or a beam corresponding to an uplink signal that is identified by the identification information received by the reception means.

According to this configuration, an uplink good beam can be efficiently selected, and can be used.

The reception means may be configured to monitor downlink reference signals transmitted by a plurality of antenna ports or beams from the base station, and the transmission means may be configured to transmit an uplink signal including identification information of a specific downlink reference signal received by the reception means. According to this configuration, the base station side can specify a beam corresponding to a downlink reference signal of good reception quality.

The uplink signal is mapped, for example, to continuous OFDM symbols in a subframe for each antenna port or each beam. According to this configuration, it becomes possible to solve a problem of power control in a case where mapping is performed in the last one symbol in a subframe like the conventional technique.

Also, according to the present embodiment, there is provided a base station configured to perform communication with a user apparatus in a radio communication system including the base station and the user apparatus, including:

transmission means configured to transmit a plurality of downlink reference signals by a plurality of antenna ports or beams; and reception mans configured to receive, from the user apparatus that monitors the plurality of downlink reference signals, an uplink signal including identification information of a specific downlink reference signal received by the user apparatus;

wherein the transmission means is configured to transmit control information to the user apparatus by using an antenna port or a beam corresponding to a downlink reference signal that is identified by the identification information received by the reception means.

According to this configuration, a beam corresponding to a downlink reference signal of good reception quality can be specified efficiently.

The control information includes assignment information of a radio resource for the user apparatus to transmit an uplink data signal, for example.

Also, a plurality of uplink signals are transmitted from the user apparatus by a plurality of antenna ports or beams, and the transmission means is configured to transmit, to the user apparatus, together with the control information, identification information of a specific uplink signal received by the reception means from among the plurality of uplink signals. According to this configuration, for example, an uplink good beam can be selected efficiently, and it can be used by the user apparatus.

The functional configuration of each apparatus described in the present embodiment may be a configuration realized by executing a program by a CPU (processor) in the user apparatus/base station having the CPU and a memory, or may be a configuration realized by hardware such as hardware circuits including logics of processing described in the present embodiment, or may be configured by coexistence of a program and hardware.

In the above, each embodiment of the present invention has been explained. However, the disclosed invention is not limited to the embodiments. Those skilled in the art will conceive of various modified examples, corrected examples, alternative examples, substituted examples, and the like. While specific numerical value examples are used to facilitate understanding of the present invention, such numerical values are merely examples, and any appropriate value may be used unless specified otherwise. Classification into each item in the description is not essential in the present invention, and features described in two or more items may be combined and used as necessary. Subject matter described in an item may be applied to subject matter described in another item (provided that they do not contradict).

It is not always true that the boundaries of the functional units or the processing units in the functional block diagram correspond to boundaries of physical components. The operations by the plural functional units may be physically performed by a single component. Alternatively, the operations by the single functional unit may be physically performed by plural components.

For convenience of explanation, the user apparatus and the base station have been explained by using functional block diagrams. However, such apparatus may be implemented in hardware, software, or a combination thereof.

The software executed by a processor provided in the user apparatus and the software executed by a processor provided in the base station according to an embodiment of the present invention may be stored in any proper storage medium such as a Random Access Memory (RAM), a flash memory, a Read Only Memory (ROM), an EPROM, an EEPROM, a register, a hard disk (HDD), a removable disk, a CD-ROM, a database, a server and the like.

The present invention is not limited to the above-mentioned embodiment and is intended to include various variations, modifications, alterations, substitutions and so on without departing from the spirit of the present invention.

DESCRIPTION OF REFERENCE SIGNS

10 macro base station
12 base station
121 signal transmission unit
122 signal reception unit
123 reception quality measurement unit
124 control information generation unit
201 signal transmission unit
202 signal reception unit
203 reception quality measurement unit
204 control information storage unit
205 sounding reference signal generation unit

The invention claimed is:

1. A user apparatus comprising:
   a receiver configured to receive a plurality of synchronization signals; and
   a transmitter configured to transmit a sounding reference signal associated with a specific synchronization signal of the plurality of synchronization signals,
   wherein the transmitter maps the sounding reference signal associated with the specific synchronization signal to consecutive OFDM symbols in one slot, and
   wherein the sounding reference signal is associated with identification information of the specific synchronization signal.

2. The user apparatus as claimed in claim 1, wherein the transmitter transmits the sounding reference signal by performing frequency hopping.

3. A signal transmission method performed by a user apparatus comprising:
   receiving a plurality of synchronization signals; and
   transmitting a sounding reference signal associated with a specific synchronization signal of the plurality of synchronization signals,
   wherein, in the transmitting, the user apparatus maps the sounding reference signal associated with the specific synchronization signal to consecutive OFDM symbols in one slot, and
   wherein the sounding reference signal is associated with identification information of the specific synchronization signal.

* * * * *